United States Patent [19]

Woods

[11] 3,985,386
[45] Oct. 12, 1976

[54] VEHICLE ROLL-OVER PROTECTIVE STRUCTURE

[75] Inventor: Terrill Wayne Woods, Cedar Falls, Iowa

[73] Assignee: Deere & Company, Moline, Ill.

[22] Filed: Sept. 15, 1975

[21] Appl. No.: 613,549

[52] U.S. Cl. ............................... 296/102; 52/280; 180/89 A; 280/755
[51] Int. Cl.² ........................................ B62D 27/04
[58] Field of Search ................. 296/102, 28 J, 28 C; 280/106 R, 106 T, 755; 180/89 A, 89 R; 52/280

[56] References Cited
UNITED STATES PATENTS

| | | | |
|---|---|---|---|
| 3,632,134 | 1/1972 | Babbitt | 296/102 |
| 3,785,696 | 1/1974 | Moore | 296/102 |
| 3,787,085 | 1/1974 | Bucher | 296/102 |
| 3,841,430 | 10/1974 | Babbitt | 180/89 A |
| 3,841,430 | 10/1974 | Babbitt | 180/89 A |

*Primary Examiner*—Robert R. Song

[57] ABSTRACT

A vehicle roll-over protective structure includes four Y-shaped metal plates, formed to generally tripodal configurations, and welded at two legs of the three legs to the legs of two other similar tripodal plates to form an open bottom, box-like framework. The framework is fastened by its unwelded legs to a vehicle chassis which closes the bottom of the framework to form the roll-over protective structure.

15 Claims, 5 Drawing Figures

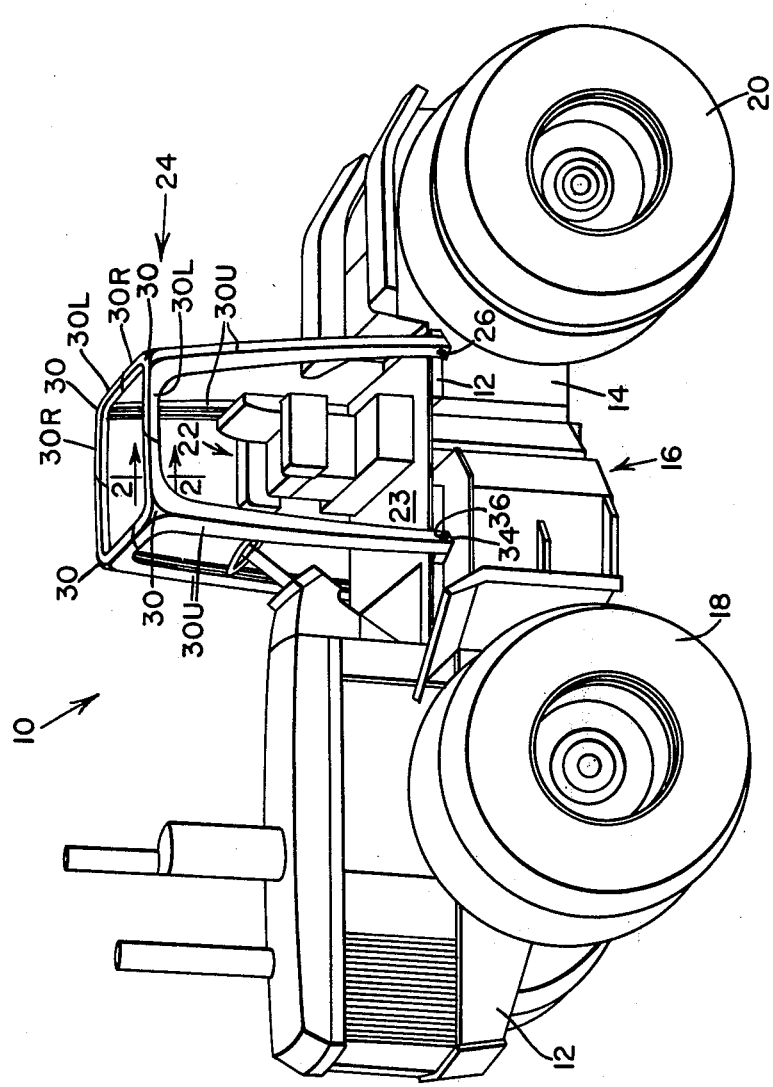
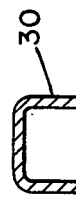

VEHICLE ROLL-OVER PROTECTIVE STRUCTURE

BACKGROUND OF THE INVENTION

The present invention relates generally to roll-over protective structures for vehicles and more particularly to such structures which are easily manufactured, inexpensive and failure resistant.

Generally, previous protective structures have been made with upright supports requiring rigidity-adding longitudinal and lateral cross members topped by a canopy. Such structures are shown in the U.S. Pat. No. 3,787,085 granted to D. H. Bucher, et al on Jan. 22 1974, and the U.S. Pat. No. 3,841,430 granted to J. H. Babbitt, Jr., et al on Oct. 15, 1974. In some cases since tubular closed sections members were used, previous structures required parts to protect against corner failures where the upright supports were fastened to the canopy such as disclosed in the U.S. Pat. No. 3,632,134 granted to J. H. Babbitt, Jr., et al on Jan. 4, 1972.

SUMMARY OF THE INVENTION

It is an object of the present invention to provide an easily manufactured roll-over protective structure which utilizes a "loose leg" design concept. The loose leg concept substitutes the vehicle chassis in place of the lower lateral and longitudinal cross braces currently required in similar protective structures and thus cuts assembly and material costs. Further, since only the legs are secured to the frame, the structure can easily be removed from the chassis for servicing of the vehicle.

By virtue of the roll-over protective structure's simple construction, certain manufacturing freedoms may be utilized in producing each plate member which makes up the structure. For example, it is possible to manufacture various size roll-over protective structures for a wide variety of vehicles with a minimum amount of tooling and low labor costs.

The present invention further provides a roll-over protective structure which utilizes a "reverse loading" design concept to optimize the structural design. The reverse loading concept places the maximum and minimum section moduli of each structure at the point where the maximum and minimum bending moments, respectively, are likely to occur during a vehicle roll-over. This maximizes structural strength while minimizing the amount of material required.

Further, by forming a tripodal configuration from each of the plate members, the joints may be placed away from the corners of the structure. Generally, the corners are subject to the highest stress, and thus, the lack of joints at the corners minimizes the possibility of corner failures.

The above and additional objects and advantages of the present invention will become apparent to those skilled in the art from a consideration of the following detailed description of the preferred embodiments when taken in conjunction with the accompanying drawings.

BRIEF DESCRIPTION OF THE DRAWINGS

FIG. 1 is a perspective view of the left side of a roll-over protective structure as shown mounted on a vehicle.

FIG. 2 is a section taken along line 2—2 of FIG. 1.

DESCRIPTION OF THE PREFERRED EMBODIMENTS

Figure 4:
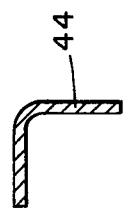
FIG. 4 is a section taken along line 4—4 of FIG. 3.

Referring now to FIG. 1, there is shown a vehicle or tractor designated in its entirety by the reference numeral 10. The tractor 10 includes a longitudinally extending front frame overhanging a hinge pin area 16 which pivotally connects the frame 12 to a longitudinally extending rear frame 14. The front and rear frames 12 and 14 each include conventional transmission, drive, and axle housings, and each is supported by a pair of dual drive wheels 18 and 20, respectively, rotatably secured thereto for rotation about the transverse axes of the frames 12 and 14. An operator's control station, designated in its entirety by the numeral 22, having a platform 23 is spaced vertically above the overhang of frame 12.

A roll-over protective structure 24 is secured to the frame 12 by mounting means 26 which will hereinafter be described. The structure 24 surrounds the operator's control station 22 to protect a seated operator in the event of a tractor roll-over.

The structure 24 includes four substantially identical tripodal members 30 each having an upright leg 30U bifurcated at its upper end into a right and left leg 30L and 30R. The members 30 are preferably blanked from flat metal plate, preferably ranging from 0.25 inch to 0.50 inch thick, into substantially Y-shaped configurations. The Y-shaped configurations are then formed in a forming die to form the tripodal members having an open section, U-channel cross section as shown in FIG. 2.

The advantage of blanking and forming is that different length, height, and width roll-over protective structures for a wide variety of different configuration and size vehicles can be made by merely adding a trimming operation; the same blanking dies can blank a number of different thicknesses of metal, the same forming dies can form the different thicknesses, and the trimming operation can trim the legs to different lengths.

The structure 24 is unitized by welding together the legs 30R and 30L of each tripodal member 30 to the legs 30L and 30R, respectively, of other tripodal members 30 until four tripodal members form an open-bottom, box-like framework having upright legs 30U. Welding the ends of the legs together places the relatively weak welded joints of the framework away from the bifurcations or corners where the loads are generally concentrated during a tractor roll-over. Further, the open sections permit large deflections in the corners, both of which minimize the possibility of corner failures due to fracture or localized buckling.

At the bottom ends of the four upright legs 30U are the mounting means 26 which include four conventional, vibration absorbing, rubber bushings 34 inserted into holes in the upright legs 30U. Easily removable bolts 36 are inserted through the four rubber bushings 34 to demountably secure the framework to the frame 12. When secured, the frame 12 closes off the bottom of the framework to complete the roll-over protective structure 24. Thus, the four tripodal members 30 are connected together at the top only and the legs can be "loose" until the framework is mounted on the frame 12. Since the conventional lower lateral and longitudinal cross braces are no longer required, this means that significant weight and cost reductions are achieved.

A further weight savings and an optimization of design has been achieved by the application of a "reverse loading" design concept which is easily applicable to open section structures. The reverse loading concept assumes the maximum bending moment in the event of a tractor roll-over to be at the bifurcations or the top corners of the structure 24 with a steadily decreasing moment down the upright legs 30U to a minimal moment at the mounting means 26. The design concept then generally places the maximum section moduli of the U-sections at the bifurcations with steadily decreasing section moduli down the upright legs 30U to minimum section moduli at the mounting means 26. The section moduli at the bifurcations of the structure 24 shown in FIG. 1 are approximately three times greater than at the bottoms of the legs 30U. These section moduli do not yield to a uniform stress distribution in the elastic region during tractor roll-over loading, but do when the structure 24 is loaded into the plastic range.

Figure 3:
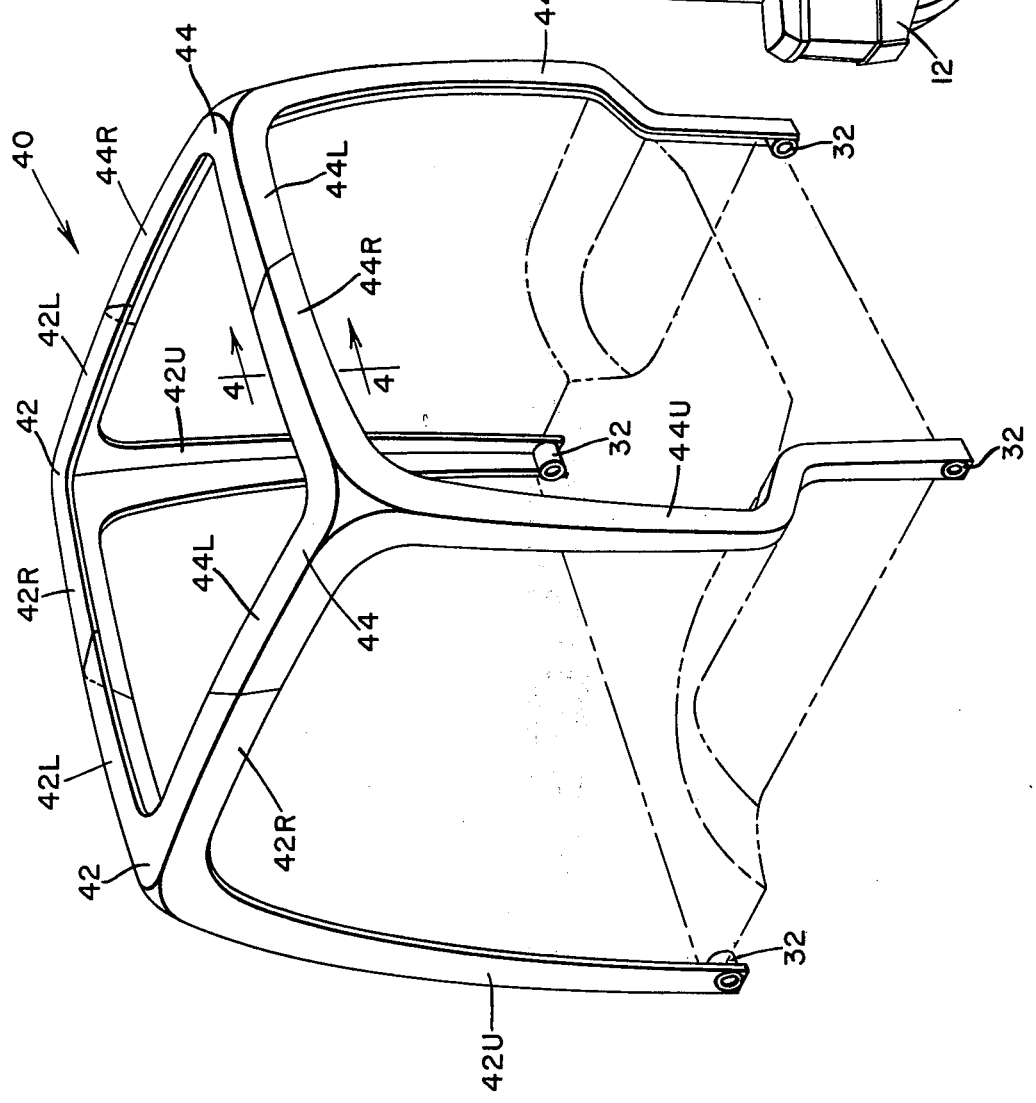
FIG. 3 is a perspective view of a roll-over protective structure of an alternate embodiment.

Referring now to FIG. 3 there is shown a further alternate embodiment of a roll-over protective structure 40 which includes two pairs of different tripodal members 42 and 44. The tripodal members 42 each have an upright leg 42U bifurcated at its upper end into a left and right leg 42L and 42R while the tripodal members 44 each have an irregularly contoured upright leg 42U bifurcated at its upper end into a right and left legs 44r and 44L. The legs 44U are contoured to provide clearance for tractor parts such as wheels. The contour can be easily produced by an additional forming operation just before the members are welded together.

In the alternate embodiment shown in FIG. 3, the blanked Y-shaped configuration is formed into an open section, right angle section as shown in FIG. 4. The right angle section provides a slightly weaker section having smaller section moduli, but permits mounting auxiliary items, such as glass, in a simple and straight forward fashion.

Figure 5:
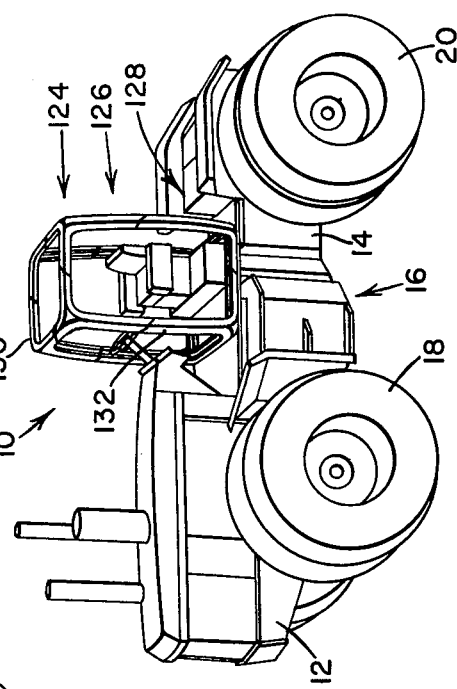
FIG. 5 is a perspective view of a roll-over protective structure of a further alternate embodiment.

Referring now to FIG. 5, therein is shown a further alternate embodiment of the roll-over protective structure generally designated by 124. The structure 124 is composed of two different box-type frameworks 126 and 128. The framework 126 is a weldment of four substantially identical tripodal members 130, manufactured as previously described above, rigidly mounted on the framework 128. The framework 128 is a weldment of four substantially identical tripodal members 132 different from the tripodal members 130 but manufactured in a similar manner. Each of the upright legs of the tripodal members 130 is welded to a corresponding upright leg of the tripodal members 132 to form a closed box-type structure which is secured to the frame 12 by vertical bolts and bushings (not shown) through the inside lower portions of the upright legs of the tripodal members 132. The inward slope of the legs toward the bottom of the framework 128 provides clearance for tractor parts such as wheels.

While the invention has been described in conjunction with specific embodiments, it is to be understood that many alternatives, modifications, and variations will be apparent to those skilled in the art in light of the aforegoing description. Accordingly, it is intended to embrace all such alternatives, modifications, and variations which fall within the spirit and scope of the appended claims.

I claim:

1. A roll-over protective structure for a vehicle having longitudinally extending frame means supported by wheel means, comprising: a plurality of tripodal members each having an upright leg bifurcated at the upper end into a right and left leg, and each tripodal member rigidly connected at its right leg to the left leg of a first adjacent tripodal member and at its left leg to the right leg of a second adjacent tripodal member, and said tripodal members having means at the lower ends of the upright legs for mounting the tripodal members on the frame means.

2. The roll-over protective structure as claimed in claim 1 wherein the means for mounting includes an inverted lower roll-over protective structure having a plurality of lower tripodal members, each lower tripodal member having an upright leg rigidly connected to an upright leg of a corresponding one of the first mentioned tripodal members and bifurcated at the lower end into a right and left leg, each lower tripodal member rigidly connected at its right leg to the left leg of a first adjacent lower tripodal member and at its left leg to the right leg of a second adjacent lower tripodal member, and said lower tripodal members having means at the lower ends of the upright legs for securing the lower tripodal members to the frame means.

3. The roll-over protective structure as claimed in claim 1 wherein the upright leg of each tripodal members has a varying section modulus from the bifurcation down to the bottom of the leg.

4. The roll-over protective structure as claimed in claim 3 wherein the upright leg of each tripodal member has a decreasing section modulus from the bifurcation down to the bottom end of the leg.

5. The roll-over protective structure as claimed in claim 4 wherein the legs of the tripodal members are of open section cross section.

6. The roll-over protective structure as claimed in claim 5 wherein the open section is a U-channel cross section.

7. The roll-over protective structure as claimed in claim 5 wherein the open section is a right angle cross section.

8. A roll-over protective structure for a vehicle having longitudinally extending frame means supported by wheel means, comprising: four tripodal members each having an upright leg bifurcated at the upper end into a left and right leg, and each tripodal member rigidly connected at the end of its right leg to the left leg of a first adjacent tripodal member and at the end of its left leg to the right leg of a second adjacent tripodal member to form an open bottom, box-type framework; and said upright legs having means at the lower end for mounting the framework on the frame means to form the roll-over protective structure.

9. The roll-over protective structure as claimed in claim 8 wherein the means for mounting includes an inverted lower roll-over protective structure having four lower tripodal members each having an upright leg rigidly connected to an upright leg of a corresponding one of the first mentioned tripodal members and bifurcated at the lower end into a left and right leg, each lower tripodal member rigidly connected at its right leg to the left leg of a first adjacent lower tripodal member and at its left leg to the right leg of a second adjacent tripodal member, and said lower tripodal members having means at the lower ends of the upright legs for demountably securing the lower tripodal members to the frame means.

10. The roll-over protective structure as claimed in claim 8 wherein the upright leg of each tripodal member has a varying section modulus from the bifurcation down to the bottom of the leg.

11. The roll-over protective structure as claimed in claim 10 wherein the upright leg of each tripodal member has a decreasing section modulus from the bifurcation down to the bottom end of the leg.

12. The roll-over protective structure as claimed in claim 8 wherein the upright leg of one tripodal member is contoured.

13. The roll-over protective structure as claimed in claim 8 wherein the legs of the tripodal members are of open section cross section.

14. The roll-over protective structure as claimed in claim 13 wherein the open section is a U-channel cross section.

15. The roll-over protective structure as claimed in claim 13 wherein the open section is a right angle cross section.

* * * * *